United States Patent [19]

McCasland

[11] Patent Number: 5,637,234
[45] Date of Patent: Jun. 10, 1997

[54] APPARATUS AND METHOD FOR SEPARATING FLUIDS HAVING DIFFERENT SPECIFIC GRAVITIES, SUCH AS OIL AND WATER

[76] Inventor: Edwin D. McCasland, P.O. Box 4113, Pocatello, Id. 83205

[21] Appl. No.: 473,709

[22] Filed: Jun. 7, 1995

Related U.S. Application Data

[63] Continuation-in-part of Ser. No. 269,646, Jun. 30, 1994.
[51] Int. Cl.$^6$ .................................................. C02F 1/40
[52] U.S. Cl. .......................... 210/801; 210/519; 210/534; 210/540
[58] Field of Search ............................. 210/519, 521, 210/534, 535, 538, 540, 861, 803, 305, 320

[56] References Cited

U.S. PATENT DOCUMENTS

| | | | |
|---|---|---|---|
| 1,147,881 | 7/1915 | Morris | 210/540 |
| 1,278,326 | 10/1918 | Kutzer | 210/538 |
| 1,672,583 | 6/1928 | Travers | 210/801 |
| 2,058,044 | 10/1936 | Spencer | 210/538 |
| 2,304,248 | 12/1942 | Entwistle et al. | 210/519 |
| 2,355,305 | 8/1944 | Koenig | 210/519 |
| 4,064,054 | 12/1977 | Anderson et al. | 210/536 |
| 4,123,365 | 10/1978 | Middelbeek | 210/521 |
| 4,132,652 | 1/1979 | Anderson et al. | 210/536 |
| 4,213,865 | 7/1980 | Wagner | 210/522 |
| 4,278,545 | 7/1981 | Batutis et al. | 210/521 |
| 5,204,000 | 4/1993 | Steadman et al. | 210/519 |

*Primary Examiner*—Christopher Upton
*Attorney, Agent, or Firm*—Ormiston Korfanta Dunbar & Holland

[57] ABSTRACT

An apparatus and method for separating a mixture of fluids having different specific gravities, such as oil and water. The method comprises separating the mixture into multiple streams and discharging the multiple streams into a vessel below the surface of the water and directing the multiple streams against a baffle plate having a vertical surface inside the vessel, thereby increasing the rate at which the fluids would otherwise separate. Another aspect of the invention provides a separator that comprises a vessel, a baffle plate having a vertical surface inside the vessel, an inlet means for delivering the mixture to the vessel, a distribution means connected to the inlet means for separating the mixture into multiple streams and discharging the multiple streams below the surface of the heavier fluid, typically water, and against the baffle plate, thereby increasing the rate at which the fluids separate. The heavier fluid is maintained at the desired level by a separator plate located behind the baffle plate. The separator plate extends from the bottom of the vessel to the desired level of the heavier fluid. The lighter fluid may be removed from the vessel by draining it directly off the surface of the heavier fluid or by allowing it to flow into a and drain from the bottom of that reservoir. The heavier fluid may be drained from the bottom portion of the vessel behind the separator plate.

10 Claims, 3 Drawing Sheets

APPARATUS AND METHOD FOR SEPARATING FLUIDS HAVING DIFFERENT SPECIFIC GRAVITIES, SUCH AS OIL AND WATER

CROSS REFERENCE TO RELATED APPLICATION

This is a continuation-in-part of copending application Ser. No. 08/269,646 filed Jun. 30, 1994 by E. McCasland entitled APPARATUR FOR SEPARATING OIL AND WATER.

FIELD OF THE INVENTION

The invention relates generally to an apparatus and method for separating fluids having different specific gravities, typically oil and water, and more particularly to an apparatus and method for separating an incoming oil-water mixture into multiple streams and discharging these streams against a baffle plate to increase the rate at which the oil separates from the water and collects on the surface of the water.

BACKGROUND OF THE INVENTION

The efficient and cost effective disposal of water contaminated with oil-based or other materials having a different specific than water presents well-known and long-standing problems. Oil, gasoline, antifreeze and the like naturally separate from water under the effects of gravity and accumulate on the surface of the water where it can be easily removed. This natural separation process is too slow to accommodate the treatment of large volumes of contaminated water unless very large settling tanks or ponds are used. The costs attendant to such large scale settling tanks make them impractical for use in most applications.

Many different systems have been devised to clean water by removing and retaining oil, thereby allowing the relatively clean water to be discharged in an environmentally safe manner. Most oil-water separators attempt to enhance or increase the rate at which oil naturally separates from water and collects on the surface of the water. Many of these oil-water separators are complex, expensive to construct and not well suited for use in varying applications and locations.

There continues to be a need for a gravity-based oil-water separator that is inexpensive to construct and operate and still effective in treating relatively large volumes of contaminated water. There is a particular need for a portable oil-water separator that is, therefore, useable in a variety of applications in diverse locations.

SUMMARY OF THE INVENTION

Accordingly, the general purpose and principal object of my invention is to provide an apparatus and method for increasing the rate at which oil and other fluid contaminates naturally separate from water to efficiently and effectively remove the contaminants from water. It is a further object of the invention to provide a portable separator that is inexpensive to construct and operate and still process relatively large volumes of water in varying applications and at diverse locations. The mixture of fluids having different specific gravities to which the invention may be applied will typically include oil and water. Therefore, for convenience, the following description relates to oil-water mixtures. It is to be understood, however, that the invention may be applied to any mixture of fluids having different specific gravities.

According to the present invention, the above objects are achieved by separating an oil-water mixture into multiple streams and discharging the multiple streams into a vessel below the surface of the water and directing the multiple streams against a baffle plate having a vertical surface inside the vessel, thereby increasing the rate at which the oil and water would otherwise separate and collect on the surface of the water.

Another aspect of the invention provides a separator that comprises a vessel, a baffle plate having a vertical surface inside the vessel, an inlet means for delivering the oil-water mixture to the vessel, a distribution means connected to the inlet means for separating the oil-water mixture into multiple streams and discharging the multiple streams below the surface of the water and against the baffle plate, thereby increasing the rate at which the oil and water separates and collects on the surface of the water. The water is maintained at the desired level by a separator plate located behind the baffle plate. The separator plate extends from the bottom of the vessel to the desired water level. The oil may be removed from the vessel by draining it directly off the surface of the water or by allowing it to flow into an oil reservoir and drain from the bottom of that reservoir. The water may be drained from the bottom portion of the vessel behind the separator plate.

In one preferred form of the invention, the distribution means comprises a feed pipe extending horizontally inside the vessel below the surface of the water, the feed pipe having a plurality of orifices disposed along the feed pipe through which the oil-water mixture is separated into multiple streams and discharged against the baffle plate. Each orifice is positioned in the feed pipe at an angle ranging from 18° to 24° above horizontal. Discharging the oil-water mixture in multiple streams against the baffle plate at the specified angles increases the rate at which the oil separates from the water and thereby increases the rate at which the oil-water mixture may be treated for environmentally safe disposal.

In another preferred form of the invention, the bottom of the vessel forms a cone to allow heavier solid particulates to collect as sludge at the bottom of the vessel where it can be periodically removed.

Other objects, advantages and novel features of the invention will become apparent to those skilled in the art from the following detailed description, wherein I have shown and described only the preferred embodiments of the invention, simply by way of illustrating the best mode contemplated by me of carrying out the invention. As will be realized, the invention is capable of other and different embodiments and uses in various applications involving contaminants having a specific gravity less than that of water, and its several details are capable of modifications in various obvious respects, all without departing from the scope of the inventive concept. Accordingly, the drawings and description are to be regarded as illustrative in nature, and not as restrictive.

DETAILED DESCRIPTION OF THE INVENTION

Figure 1:
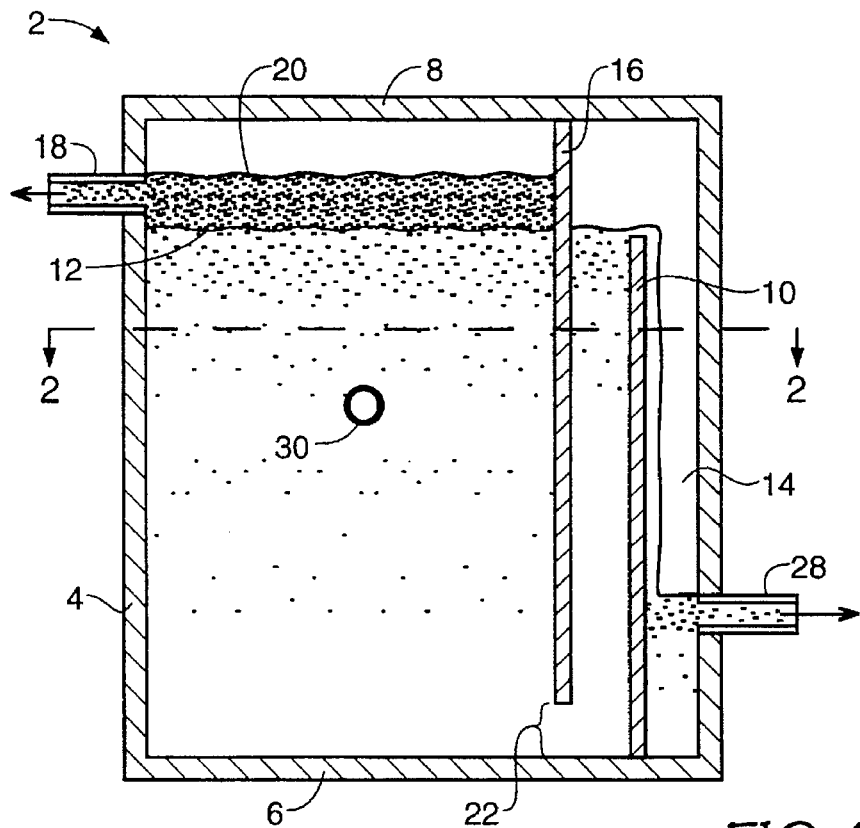
FIG. 1 is a cross-section elevation view of a preferred embodiment of the invention.
Figure 2:
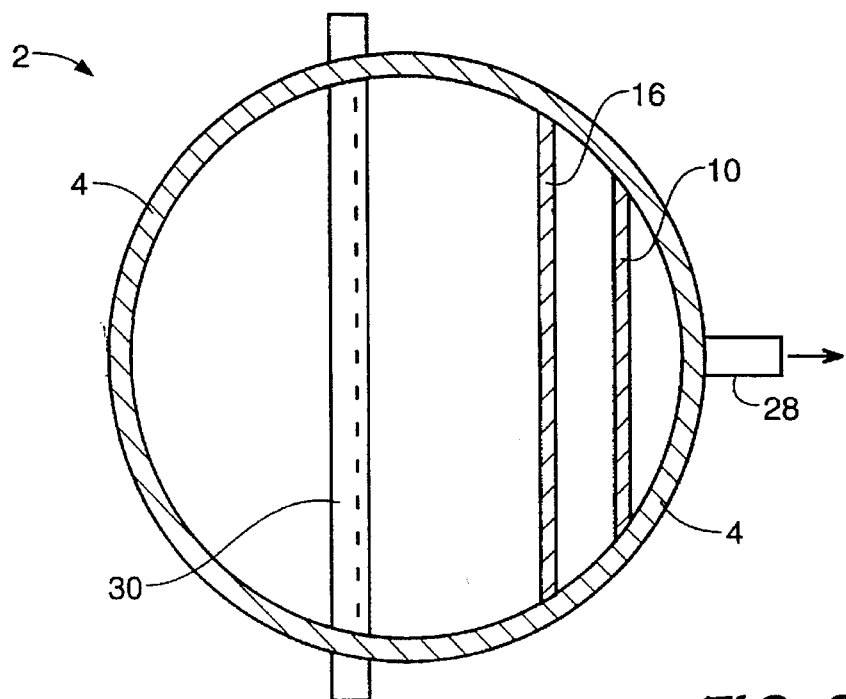
FIG. 2 is a cross-section plan view of a preferred embodiment of the invention taken along the line A—A in FIG. 1.
Figure 5:
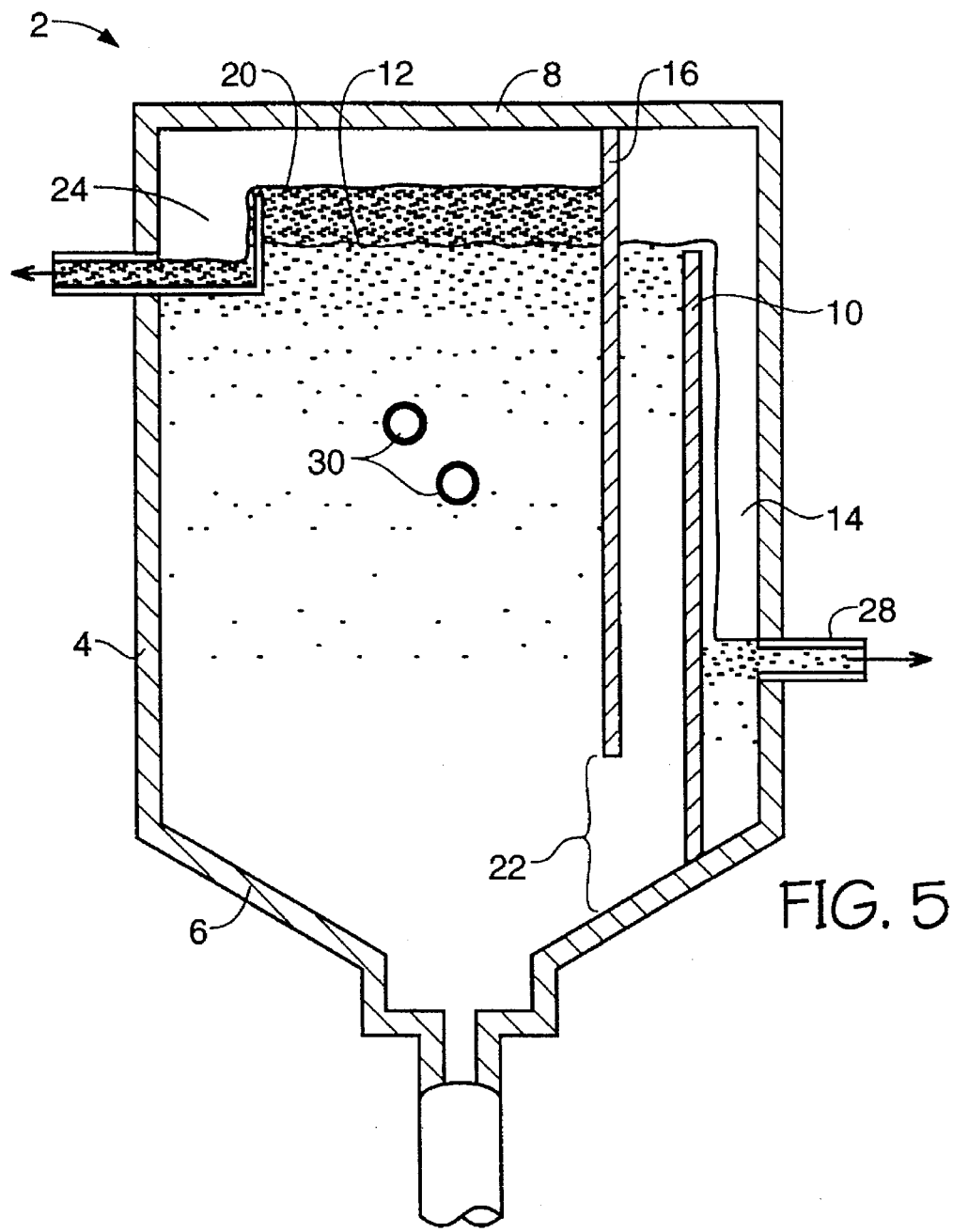
FIG. 5 is a cross-section view of an alternative embodiment of the invention providing for sludge removal.

Referring to FIGS. 1 and 2, vessel 2 consists of cylindrical body 4 and bottom plate 6. Bottom plate 6 may be integral with body 4 or attached to body 4 by any conventional means such as welding or bolting. Bottom plate 6 is typically flat, but may be conical as shown in FIG. 5 if sludge removal is desired. Vessel 2 may also have a top plate 8 when a closed vessel is desired.

Separator plate 10 is rectangular and attached to body 4 so that it describes a first chord of the circular cross-section of body 4. Separator plate 10 extends from bottom plate 6 to the desired water level 12 in vessel 2. That is, water level 12 is determined by the height of separator plate 10. Water reservoir 14 is the space bounded by separator plate 10 and body 4. In the preferred embodiment, separator plate 10 is welded to body 4 and bottom plate 6.

Baffle plate 16 is rectangular and attached to body 4 inside of and generally parallel to separator plate 10 so that it describes a second chord of the circular cross-section of body 4. Oil drain 18 is attached to body 4 above water level 12 at the desired oil level 20. That is, oil level 20 is determined by the height of oil drain 18. Baffle plate 16 extends from a predetermined distance 22 above bottom plate 6 to above oil level 20. Predetermined distance 22 is not critical except that it must be sufficient to allow water to pass between baffle plate 16 and bottom plate 6 at least at the same rate as the rate at which water is entering vessel 2 as part of the oil-water mixture.

In the preferred embodiment as shown in FIG. 1, oil drain 18 is a pipe that extends through body 4 to allow oil that collects on the surface of the water to drain or to be pumped from vessel 2. Alternatively, oil drain 18 may consist of an oil reservoir 24 and oil reservoir drain pipe 26 as shown in FIG. 5. The size of oil drain 18 is not critical except that it must have sufficient capacity to drain oil from vessel 2 at least at the same rate as the rate at which oil is entering vessel 2 as part of the oil-water mixture.

Water drain pipe 28 is attached to and extends through body 4 near the bottom of water reservoir 14 to allow water from which the oil has been separated to drain or to be pumped from vessel 2. Water drain pipe 28 is sized to allow water to drain from vessel 2 at least at the same rate as the rate at which water is entering vessel 2 as part of the oil-water mixture.

Figure 3:
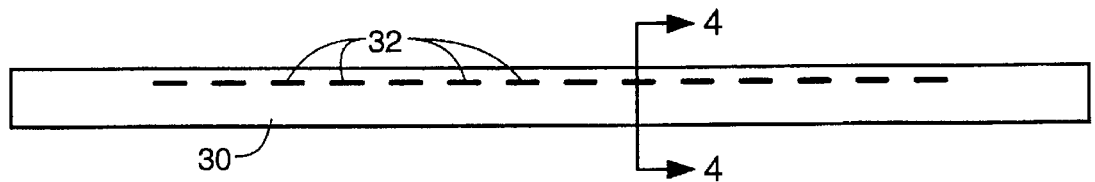
FIG. 3 illustrates the feed pipe of a preferred embodiment of the invention.

An inlet means (not shown) delivers the oil-water mixture to vessel 2 via feed pipe 30. The inlet means may be any conventional system for delivering the oil-water mixture from its source or from storage to vessel 2, such as pumping or gravity feed systems. Feed pipe 30 is attached to and extends horizontally through and across body 4. Feed pipe 30 is positioned approximately 12 inches to 36 inches below water level 12. Feed pipe 30 is positioned at a distance ranging from 12 inches to 36 inches from baffle plate 16. As shown in FIG. 3, feed pipe 30 has a plurality of horizontally spaced apart orifices 32 along its length within vessel 2. One end of feed pipe 30 is connected to the inlet means. The opposite end of feed pipe 30 is blocked or capped so that the oil-water mixture is discharged only through orifices 32. Orifices 32 separate the oil-water mixture into multiple streams that are discharged against baffle plate 16. Additional feed pipes may be utilized as shown in FIG. 5.

Figure 4:
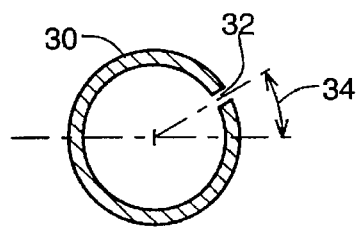
FIG. 4 is an expanded cross-section view of the feed pipe taken along the line B—B in FIG. 3.

Orifices 32 are positioned so that the oil-water mixture is discharged from feed pipe 30 through orifices 32 at a discharge angle 34 ranging from 18° to 24° above horizontal as shown in FIG. 4. Experimentation has shown that the oil and water separate most rapidly when the discharge angle 34 is approximately 22°. In the preferred embodiment, orifices 32 are horizontal slots sized and spaced apart so that the oil-water mixture is discharged at a pressure in the range of 3 psi to 10 psi, preferably about 5 psi.

In operation, the oil-water mixture is delivered to vessel 2 via feed pipe 30. The oil-water mixture is separated into multiple streams and discharged through orifices 32 at an angle 34 of approximately 22° and directed against baffle plate 16. Water weighs approximately 8.0 pounds per gallon whereas oil weighs only about 7.4 pounds per gallon. Accordingly, gravity naturally causes the water to sink and the oil to rise in the oil-water mixture. As the oil separates from the water, the oil rises and collects on the surface of the water where it is removed from vessel 2 through oil drain 18. In addition, because oil is compressible and water is not, the weight of the water tends to squeeze any remaining oil from the water, particularly in larger vessels having higher water levels. Water flows under pressure from its own weight under baffle plate 16 and over separator plate 10 into water reservoir 14. The water is then removed through water drain pipe 28.

I have discovered that the above combination significantly increases the rate at which the oil and water would otherwise separate. Although the exact mechanism by which the rate of separation increases is not known, and without limiting the scope of my invention, it is believed that the turbulence or mixing action of the incoming flow is greatly reduced as the oil-water mixture is separated into multiple streams and discharged at between 18° and 24°, preferably 22°, against the adjacent baffle plate.

The physical components of my invention may be made of any material such as steel, plastic or fiberglass that are not subject to corrosion or other deterioration when exposed to oil or other contaminants found in the water that is treated.

A production scale prototype was constructed to determine the volume of contaminated water that could be effectively treated using the above described method and apparatus. Body 4 was constructed of steel plate 6'5" high and having an inside diameter of 5' 2⅞". Feed pipe 30 was constructed of steel pipe having an inside diameter of 2½" and having orifices 32 comprising nine ¼" ×4" horizontal slots spaced apart 5½" on centers beginning 9¼" from the inside wall of body 4. Feed pipe 30 was positioned across a diameter of body 4 and 1' 6" below water level 12. Baffle plate 16 was positioned 1' 8" from feed pipe 30. The apparatus thus constructed was able to effectively treat up to 50 gallons per minute of contaminated water containing virtually any concentration of oil.

The rate at which oil is separated from water using my method and apparatus may be effected by the presence of debris or other large particles in the oil-water mixture and the type and specific gravity of the oil-based contaminants. Oil-based contaminants having a specific gravity significantly less than that of water (e.g., light crude oil, fuel oil, diesel fuel and gasoline) will be separated more rapidly than will contaminants having a specific gravity only slightly less than water (e.g., heavy crude oil). It is desirable that debris or other large contaminants be removed before treatment to maximize the efficiency with which the oil-water mixture may be treated.

Another aspect of the invention provides a means for removing relatively heavy contaminants from the water. Referring to FIG. 5, bottom plate 6 is conical and thereby allows heavy contaminants to collect as sludge at the bottom of vessel 2. The sludge can then be periodically removed by conventional means either during operation of the separator utilizing the weight of water in the vessel to push the sludge out of the vessel or after the vessel is drained.

There is shown and described only the preferred embodiments of the invention. But, as mentioned above, the present invention is capable of use in various other embodiments and applications and is capable of changes or modifications all within the scope of the inventive concept as expressed herein.

I claim :

1. An apparatus for separating a mixture of fluids having different specific gravities, which comprises:
   a. a vessel;
   b. a baffle plate having a vertical surface inside the vessel;
   c. an inlet means for delivering the mixture to the vessel;
   d. at least one feed pipe extending horizontally inside the vessel; and
   e. a plurality of orifices disposed along the feed pipe through which the mixture is separated into multiple streams and discharged against the baffle plate, each orifice positioned in the feed pipe at an angle ranging from 18° to 24° above horizontal.

2. An apparatus according to claim 1, further comprising:
   a) a first outlet means for removing the heavier fluid from the surface of the lighter fluid and from the vessel; and
   b) a second outlet means for removing the heavier fluid from the vessel.

3. An apparatus according to claim 1, wherein each orifice is positioned in the feed pipe at an angle of substantially 22° above horizontal.

4. An apparatus according to claim 1, further comprising means for providing a fluid mixture stream discharge pressure of between 3 psi and 10 psi as measured at a location where the stream is discharged from the feed pipe.

5. An apparatus for separating a mixture of fluids having different specific gravities, which comprises:
   a. a vessel having a top and a bottom;
   b. a baffle plate having a vertical surface inside the vessel and extending from above the bottom of the vessel to an upper level;
   c. an inlet means for delivering the mixture into the vessel below the upper level of the baffle plate;
   d. at least one feed pipe connected to the inlet means and extending horizontally inside the vessel parallel to the vertical surface of the baffle plate, the feed pipe having a plurality of horizontal slots positioned in the feed pipe at an angle ranging from 18° to 24° above horizontal;
   e. a separator plate located behind the baffle plate relative to the feed pipe, the separator plate extending from the bottom of the vessel to desired level of the heavier fluid below the upper level of the baffle plate;
   f. a first outlet means for allowing the lighter fluid to be removed from the vessel, the first outlet means being located above the desired level of the lighter fluid and below the upper level of the baffle plate; and
   g. a second outlet means for allowing the heavier fluid to be removed from the vessel behind the separator plate.

6. An apparatus according to claim 5, wherein the slots are positioned in the feed pipe at an angle of substantially 22° above horizontal.

7. A separator as set forth in claim 5, wherein the bottom of the vessel is conical and further comprising a sludge removal means disposed at the bottom of the vessel for removing heavy particulate contaminants from the vessel.

8. A method of separating a mixture of fluids having different specific gravities, which comprises:
   a. providing a feed pipe that extends horizontally into a vessel;
   b. positioning a plurality of orifices along the feed pipe; and
   c. discharging the mixture through the orifices at an angle ranging from 18° to 24° above horizontal and directing the mixture against a baffle plate having a vertical surface inside the vessel.

9. A method according to claim 8, wherein the is discharged at an angle of substantially 22° above horizontal.

10. A method as set forth in claim 8, wherein the feed pipe is located 12 to 36 inches below the surface of the heavier fluid and wherein the mixture is discharged into the vessel at a pressure in the range of 3 psi to 10 psi.

* * * * *